Jan. 17, 1967     H. H. HULTGREN     3,298,748
APPARATUS FOR DELIVERING MATERIAL TO STORAGE CONTAINERS
Filed July 6, 1965     4 Sheets-Sheet 1

INVENTOR.
HJALMAR HILDING HULTGREN
BY
Davis, Hoxie, Faithfull & Hapgood
ATTORNEYS.

INVENTOR.
HJALMAR HILDING HULTGREN

INVENTOR.
HJALMAR HILDING HULTGREN

United States Patent Office 3,298,748
Patented Jan. 17, 1967

3,298,748
APPARATUS FOR DELIVERING MATERIAL
TO STORAGE CONTAINERS
Hjalmar Hilding Hultgren, Uttran, Sweden, assignor to
Alfa-Laval AB, Tumba, Sweden, a corporation of
Sweden
Filed July 6, 1965, Ser. No. 469,376
Claims priority, application Sweden, July 3, 1964,
8,155/64
14 Claims. (Cl. 302—60)

The present invention refers to an apparatus for feeding and distributing material to storage containers, such as silos, having an inlet for the material in the top of the container.

The invention is intended to be used particularly for distribution in connection with filling of containers with such material having a large so-called angle of sliding, that is, which is not by itself uniformly distributed over the total area of the container, if it is filled centrally in the container, but clogs and is collected as a hillock under the filling place. For this reason the apparatus is especially suitable to be used, for example, in filling silos for the storage of fodder, in which the distribution problem is difficult to master.

Heretofore, such material was usually conveyed pneumatically in closed pipelines to the top of the silo; and by the use of a blowing nozzle, turnable over the surface of the silo, an acceptable distribution could be obtained. Recently, however, it has been the general practice to build silo plants having essentially larger dimensions, so that the feed and the distribution of the material are made more difficult. Furthermore, it has proved that pneumatic conveyors used up to now are not suitable for coarse material, for example chopped fodder, in that the feed pipes are very often clogged by the material and it is very difficult to clean the pipelines and to operate the plant without disturbances. For this reason, resort has been had to elevator feed of the material or, especially for chopped fodder, to a pneumatic conveyor device, which is characterized by the fact that the feed channel in the part wherein the feed direction is to be changed from a direction vertically upwards to a direction vertically downwards is designed with a very large radius in order to avoid clogging. At the same time, the complete bend of the feed channel is open at its underside to the outlet opening of the channel, so that the conveying air is discharged before the material leaves the channel. A common feature of the two last-mentioned conveyor devices is the fact that the material leaves the conveyor device at the container top with a relatively low velocity. Thus, the velocity is not sufficient to bring about a satisfactory distribution in the container, even if the feed into this can take place in varying directions. Distributors of the earlier known types cannot therefore be used in connection with the conveyor devices described here.

By means of the present invention, a satisfactory distribution can now be obtained also in storage containers having very large diameters and in connection with the conveyor devices described above and now generally used. According to the invention, a material fed at a low velocity into a container is accelerated to such a velocity that a distribution can take place over a very large surface. More exactly, the apparatus according to the present invention is characterized by the combination of a fan wheel provided under the inlet and located centrally in a horizontal section of the container, and a rotatable disk located under the fan wheel. With this device, it is possible to provide a distribution of the material in horizontal direction such that the surface of the material in the container will be plane instead of conical, such as earlier was the case. The merit of this is due especially to the disk.

The disk is preferably contoured in such a way that its radial dimension (distance from its axis to its periphery) is different in different radial directions. Thus, the distribution in horizontal direction can be improved, especially if the disk has a spiral contour. In order to avoid unbalance in the rotation of the disk, the contour of the disk can be formed by two equal spirals, each encircling 180° of the periphery of the disk, the spirals being turned mutually 180° in the plane of the disk and about the center of rotation of the disk.

The material may be supplied to the fan wheel by means of a vertical pipe arranged above this wheel, the pipe guiding the material downwards straight towards the fan wheel.

Advantageously, there are provided above the fan wheel rotatable impeller vanes, which have for their object to impart to the material a rotating movement before it reaches the fan wheel, so that a desired rotational movement of the material is attained more easily. The impeller vanes also mix the material homogeneously with air.

Preferably, the apparatus is adjustable in vertical direction as to the height or the degree of filling of the container.

The distance in vertical direction between the fan wheel and the disk can be adjustable, so that the distribution of the material can be varied in view of the different dimensions of the container.

The earlier mentioned vertical pipe can be provided with an annular flange connected to its outside and serving as a fan housing. Suitably, the pipe with its flange is adjustable in vertical direction in relation to the fan wheel, so that the air quantity per unit of time can be varied and adjusted to different types of material.

A special cutting of the material can be achieved by means of a rotatable knife device located above the fan wheel.

The rotatable disk can to advantage be journalled on the fan wheel shaft in such a way that it is driven by means of the friction with the shaft. In this connection, the disk can be provided with an adjustable air brake in order to control the number of revolutions of the disk.

The invention is described more in detail below, reference being had to the accompanying drawings in which.

Figure 1:
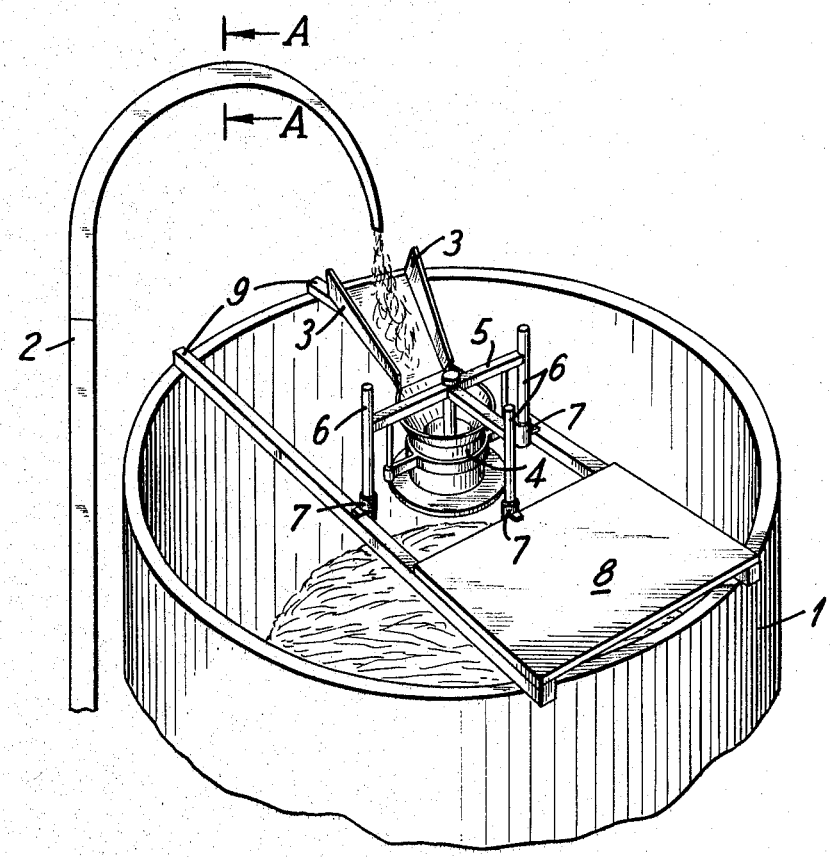
FIG. 1 is a perspective view of the upper part of a silo provided with a preferred form of apparatus according to the present invention, the motor drive being removed.
Figure 1A:
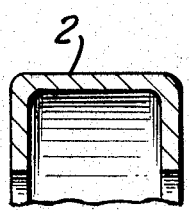
FIG. 1a is an enlarged sectional view on line A—A in FIG. 1.

In FIG. 1, reference numeral 1 designates the top of a silo, and reference numeral 2 designates a pneumatic conveyor of the previously mentioned type, in which the conveying air is separated from the feed material in the bend of the feed channel and the material leaves the channel with a low velocity. As shown in FIG. 1a, the feed channel is open at its underside in the upper bend-like part. The material is collected in a flute 3 and falls from this into a pipe 4. The apparatus comprises supporting means including a frame 5 having three legs constituting guides 6, which are slidable in holders 7 mounted on the container or silo top. If there is a lack of space, the apparatus can thus be lowered in the container. Furthermore, the apparatus can be displaced upward and used in a position above the container, which position facilitates the distribution of the material when the container is practically completely filled. Two horizontal beams 9 carry the frame holders 7 and a floor 8.

Figure 2:
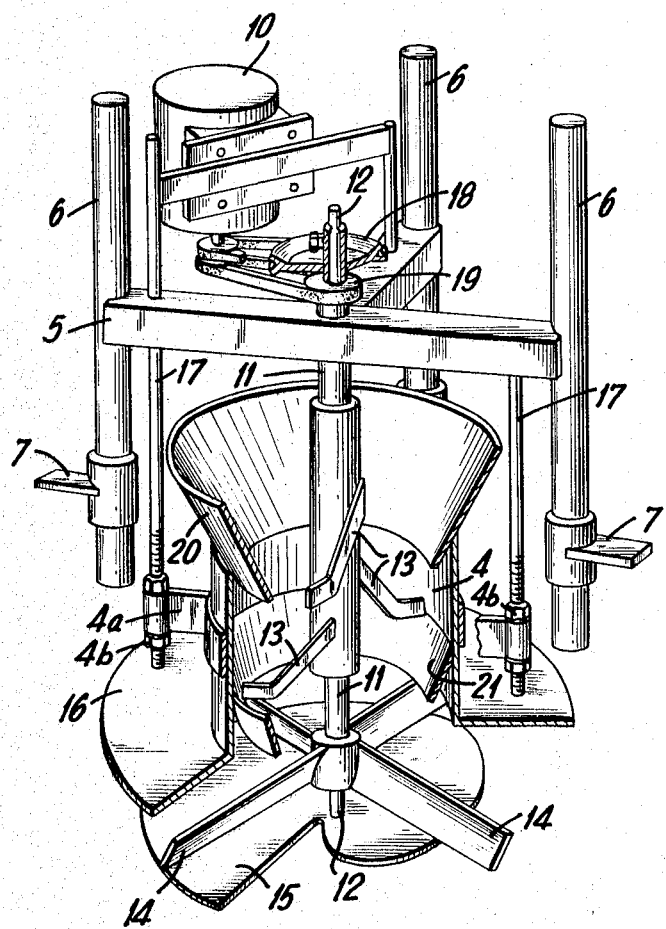
FIG. 2 is a more detailed perspective view of the apparatus shown in FIG. 1, including the motor drive but with parts broken away.

Referring to FIG. 2, the apparatus is driven by a motor 10 and effects an automatic feed and distribution of the material to the storage container 1. The material is supplied through the vertical pipe 4, in the center of which two concentric shafts 11 and 12 are mounted. The outer shaft 11 is provided with impellers 13, which cause the material to rotate in the supply channel before the material is sucked away by the air current generated by a fan wheel 14. The fan wheel is also mounted on the outer shaft 11 and blows the material down into the container 1, at the same time as a movement in radial direction is imparted to this material. The material is thus distributed "conically" outwards from the fan wheel 14. In order to prevent the material from collecting in the center below the fan wheel, the inner shaft 12 is provided with a disk 15 mounted below the fan wheel and rotating at a velocity (revolutions per minute) equal to or different from that of the fan. The disk 15 thus prevents all of the material from being fed axially downwards, since a radial movement is also imparted to a part of the material.

As will be seen from FIG. 2, the disk 15 is designed in principle as an Archimedean spiral, whereby the material leaving the fan wheel 14 axially is distributed uniformly over the area of the container.

The shaft 12 on which the disk 15 is mounted can be raised and lowered in relation to the rest of the apparatus, which allows an adjustment of the angle of distribution and thus an adjustment of the apparatus to storage containers of different size. The cylindrical feed pipe 4 mounted around the concentric shafts 11 and 12 has at its lower end an external flange forming a plane disk 16, which overlies the outer portion of the fan wheel. This disk 16, which thus constitutes the upper part of a fan housing, can be displaced together with the pipe 4 on vertical guides 17 and consequently can be adjusted to the desired vertical distance from the fan wheel 14. By this adjustment, the air quantity passing through the apparatus per unit of time can be varied and an adjustment to different types of material can be effected. The guides 17 depend from frame 5 and adjustably support the pipe 4 through brackets 4a by means of positioning nuts 4b threaded on the guides. With these provisions for independent adjustments of the upper stationary disk 16 and the lower rotating disk 15 relative to fan wheel 14, the apparatus can be adjusted to varying kinds of material and to widely different storage container sizes.

As also will be seen from FIG. 2, the two concentric shafts 11 and 12 are separately driven from motor 10 through cone belt transmissions including pulleys 19 and 18 secured to the respective shafts. It will be understood that the upper pulley 18 is releasably connected to inner shaft 12 to permit adjustment of the latter to the desired vertical position, where it may be held by sliding engagement of pulley 18 with the underlying pulley 19. The motor 10 is mounted on the same frame as the rest of the apparatus. Two conical hoppers 20 and 21 are provided in the pipe 4 so as to guide the material inwards towards the center.

Figure 3:
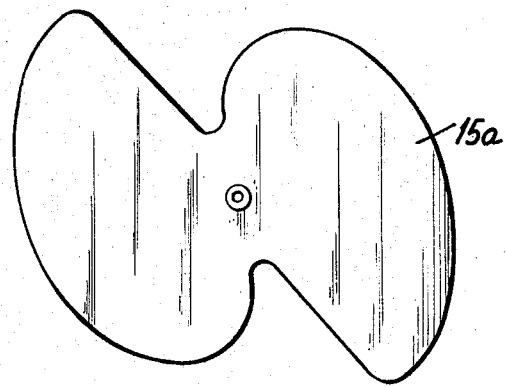
FIG. 3 is a plan view of a modified form of the rotatable disk shown in FIG. 2.

A modified form of the disk is shown at 15a in FIG. 3, in which the contour of the disk is formed by two different spirals. In this way, the disk is automatically balanced.

Figure 4:
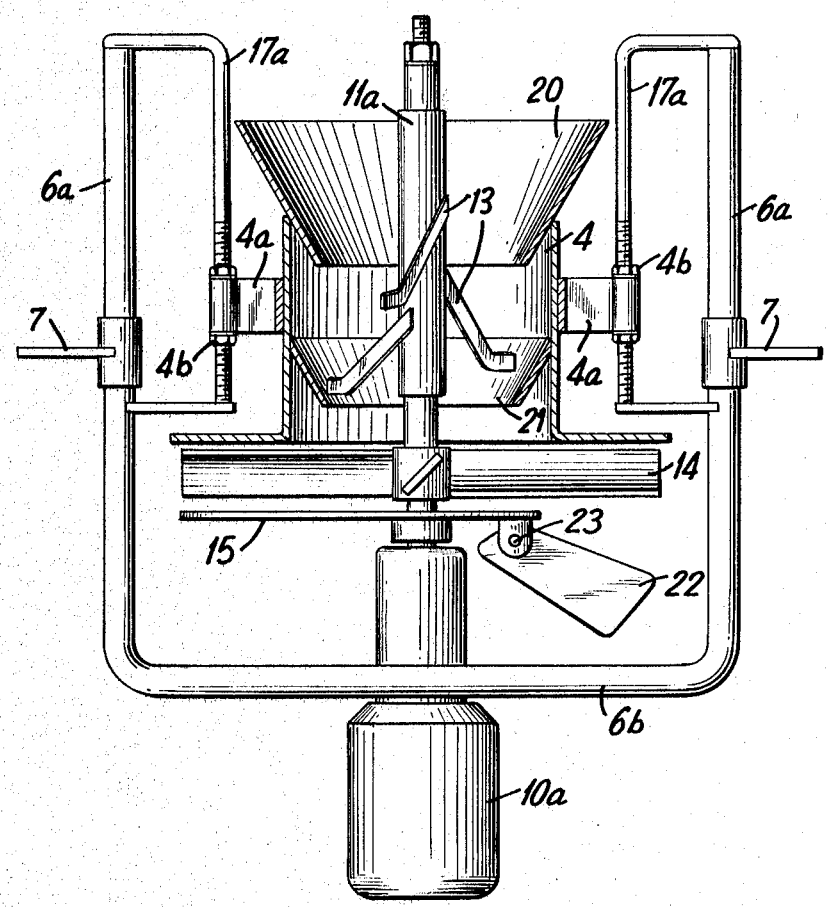
FIG. 4 is an elevational view, partly in section, of a second form of the apparatus.

In the embodiment shown in FIG. 4, the motor 10a is connected directly to the shaft 11a on which the impellers 13 and the fan wheel 14 are mounted. The disk 15 mounted below the fan wheel is journalled about the shaft 11a and is entrained by the friction forces. In order to obtain a speed of rotation different from that of the motor 10a and shaft 11a, the disk 15 can be provided with an air brake in the form of a vane 22, which is swingable in the vertical direction about a pivot 23. When the speed of rotation increases, the vane 22 is thrown outwards and increases its braking action.

As shown in FIG. 4, the motor 10a is mounted on a cross member 6b interconnecting the lower portions of guides 6a to form a supporting frame. The latter is adjustable vertically in the holders 7 and carries guides 17a on which the pipe 4 is adjustably mounted.

Figure 5:
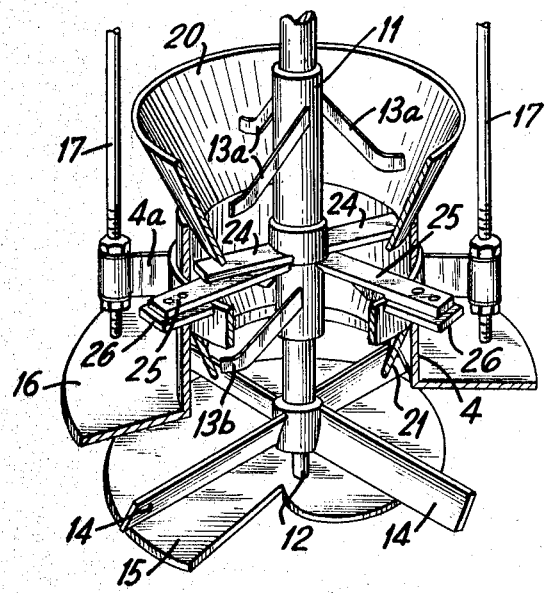
FIG. 5 is a perspective view of a third form of the apparatus, with parts cut away.
Figure 6:
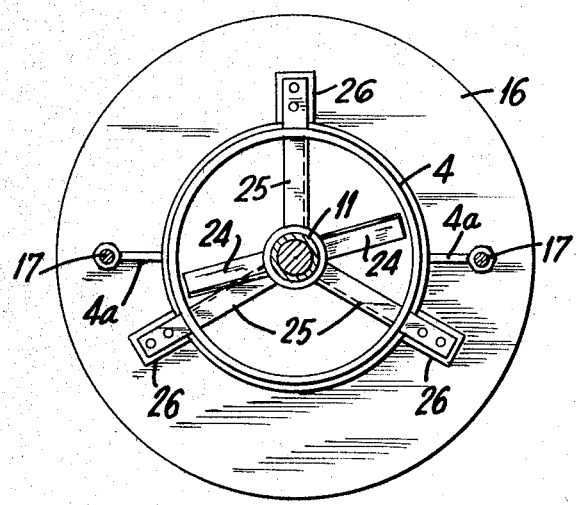
FIG. 6 is a plan view of the apparatus shown in FIG. 5.

In certain cases, especially when storing fresh fodder in a silo, the material is fed in with a particle size unsuitable for storing and automatic discharge. Automatic silo dischargers require a certain maximum size of the particles to function without disturbances. The invention can then be supplemented, as shown in FIG. 5, with a knife device comprising two knives 24 driven by the shaft 11 and coacting with three stationary knives 25 mounted on supports 26 on the outer wall of the pipe 4. Upper impellers 13a feed the material on to the knife device, in which the particle size is reduced. Thereafter, lower impellers 13b feed the material into the fan wheel 14 while imparting the desired rotation to the material.

I claim:

1. Apparatus for feeding and distributing material to a storage container, such as a silo, through a top opening of the container, which comprises a fan wheel, means including a frame for supporting the fan wheel centrally in a horizontal section of the container below said opening, said means supporting the fan wheel for rotation about a generally vertical axis, a disk mounted on the frame for rotation about a generally vertical axis and underlying said fan wheel, said disk being contoured to give it a radial dimension which is different in different radial directions, and driving means operatively connected to the fan wheel for rotating said wheel.

2. Apparatus according to claim 1, in which said rotation axis of the fan wheel coincides with said rotation axis of the disk.

3. Apparatus according to claim 1, in which the disk has a spiral contour.

4. Apparatus according to claim 1, in which the disk has a contour formed by two equal spirals each extending substantially 180° about the disk axis.

5. Apparatus according to claim 1, comprising also a generally vertical pipe mounted on the frame and forming an inlet for said material, the pipe being positioned to direct the material downwardly toward the fan wheel.

6. Apparatus according to claim 1, comprising also impeller vanes rotatably mounted on the frame above the fan wheel and operatively connected to said driving means for rotating the material before it reaches the fan wheel.

7. Apparatus according to claim 1, in which said supporting means also include a holder on which the frame is adjustably mounted for vertical movement relative to the container.

8. Apparatus according to claim 1, in which the disk is adjustable vertically relative to the fan wheel.

9. Apparatus for feeding and distributing material to a storage container, such as a silo, through a top opening of the container, which comprises a fan wheel, means including a frame for supporting the fan wheel centrally in a horizontal section of the container below said opening, said means supporting the fan wheel for rotation about a generally vertical axis, a disk mounted on the frame for rotation about a generally vertical axis and underlying said fan wheel, driving means operatively connected to the fan wheel for rotating said wheel, and a generally vertical feed pipe mounted on the frame and forming an inlet for said material, the pipe being positioned to direct the material downwardly toward the fan wheel, said pipe having an external annular flange on its lower portion overlying the fan wheel.

10. Apparatus according to claim 9, comprising also means for adjusting said pipe and flange vertically relative to the fan wheel.

11. Apparatus for feeding and distributing material to a storage container, such as a silo, through a top opening of the container, which comprises a fan wheel, means including a frame for supporting the fan wheel centrally in a horizontal section of the container below said opening, said means supporting the fan wheel for rotation about a generally vertical axis, a disk mounted on the frame for rotation about a generally vertical axis and underlying said fan wheel, driving means operatively connected to the fan wheel for rotating said wheel, and cutting means including a rotatable knife mounted on the frame above the fan wheel for cutting said material on its way to the wheel.

12. Apparatus for feeding and distributing material to a storage container, such as a silo, through a top opening of the container, which comprises a fan wheel, means including a frame for supporting the fan wheel centrally in a horizontal section of the container below said opening, said means supporting the fan wheel for rotation about a generally vertical axis, a disk mounted on the frame for rotation about a generally vertical axis and underlying said fan wheel, driving means operatively connected to the fan wheel for rotating said wheel, and an operative connection between said driving means and the disk for rotating the disk at a different speed than the fan wheel.

13. Apparatus according to claim 12, in which said supporting means include a generally vertical shaft rotatably mounted on the frame and to which the fan wheel is secured, said shaft operatively connecting the driving means to the fan wheel, said disk being journaled on the shaft and driven by frictional engagement therewith.

14. Apparatus for feeding and distributing material to a storage container, such as a silo, through a top opening of the container, which comprises a fan wheel, means including a frame for supporting the fan wheel centrally in a horizontal section of the container below said opening, said means supporting the fan wheel for rotation about a generally vertical axis, a disk mounted on the frame for rotation about a generally vertical axis and underlying said fan wheel, driving means operatively connected to the fan wheel for rotating said wheel, said supporting means including a generally vertical shaft rotatably mounted on the frame and to which the fan wheel is secured, said shaft operatively connecting the driving means to the fan wheel, said disk being journaled on the shaft and driven by frictional engagement therewith, the apparatus comprising also an adjustable air brake operatively connected to the disk to retard its rotational speed relative to that of the fan wheel.

References Cited by the Examiner

UNITED STATES PATENTS

| 1,182,619 | 5/1916 | Bagg | 302—60 |
| 3,001,465 | 9/1961 | Donelson | 302—60 |
| 3,184,081 | 5/1965 | Perdue, et al. | 214—17.6 X |

FOREIGN PATENTS

| 234,738 | 6/1925 | Great Britain. |

ANDRES H. NIELSEN, *Primary Examiner.*